W. MAYNARD.
APPARATUS FOR THE HYDRATION OF CHLORINE GAS.
No. 186,860. Patented Jan. 30, 1877.
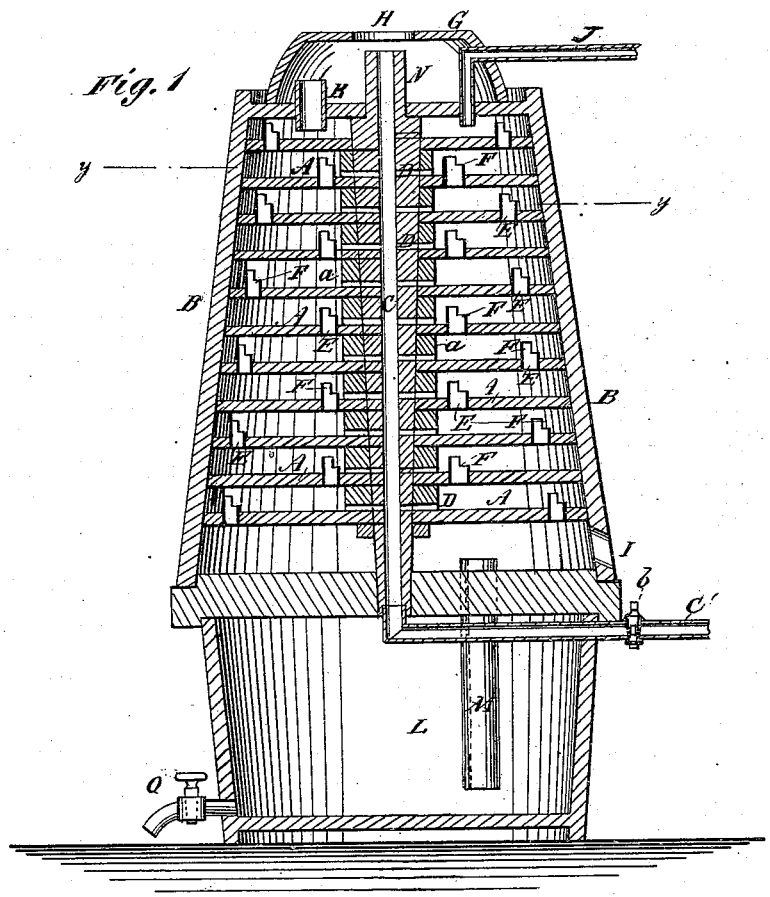
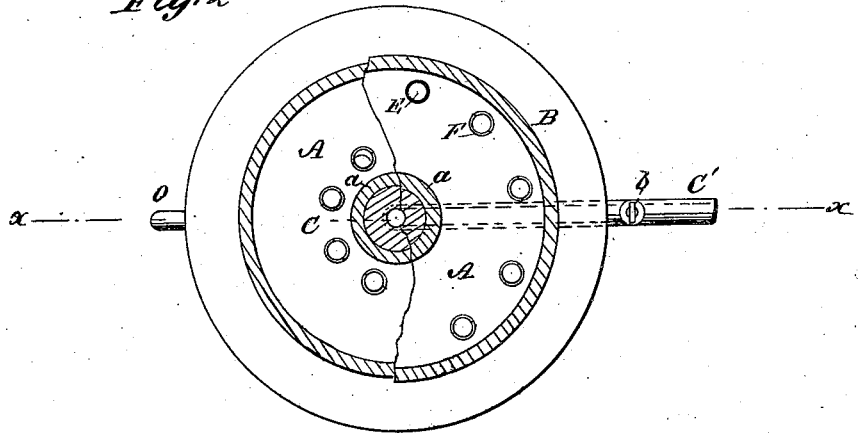

UNITED STATES PATENT OFFICE.

WILLIAM MAYNARD, OF PHILADELPHIA, PENNSYLVANIA.

IMPROVEMENT IN APPARATUS FOR THE HYDRATION OF CHLORINE GAS.

Specification forming part of Letters Patent No. 186,860, dated January 30, 1877; application filed May 16, 1876.

*To all whom it may concern:*

Be it known that I, WILLIAM MAYNARD, of the city and county of Philadelphia, and State of Pennsylvania, have invented a new and Improved Apparatus for Hydrating Chlorine Gas; and I do hereby declare that the following is a full, clear, and exact description of the same, reference being had to the accompanying drawing, forming part of this specification.

My invention relates to an improved construction of apparatus for the hydration of gases, and more particularly chlorine gas, for the purpose of manufacturing chlorine water, for use in the industrial arts of bleaching, &c. It consists in the particular construction and arrangement of parts, whereby the best contact and most perfect absorption of the gas by the water is secured, the passage of the gas through the chamber facilitated, and the internal structure of the apparatus readily cleansed from the deposited impurities, all as hereinafter more fully described.

Figure 1 is a vertical section of my improved apparatus, taken upon the line $x\ x$ of Fig. 2. Fig. 2 is a horizontal section taken upon the line $y\ y$ of Fig. 1.

Referring to the figures of the drawing, in which similar letters indicate corresponding parts, A represents a series of circular horizontal plates, of diminishing diameters from the bottom to the top, made of glass, earthenware, or other analogous material, and fitted in a circular truncated conical case, B, a distance of from one to three inches apart. Said case B is also made of glass, earthenware, or other analogous material, and is provided at the top with an inlet-pipe, J, for the water, and at the bottom with an inlet, I, for the chlorine or other gas. The plates A are provided with apertures E, effecting a communication between the alternate chambers, which apertures are located in one set of plates near their circumference, and in the intermediate ones near the center, the object of which is to give a zigzag course to the passage of the water and gas, so as to produce a larger contact between the same. In these apertures are arranged the short upwardly-projecting tubes F, which have one portion of their projecting peripheries cut away, so as to leave the other portion to project about one-third higher. The object of these tubes is to hold a permanent surface of water above the plates to absorb the gas, while constructing them with a cut-away portion is to admit the passage of the water from one chamber to the next below it, and the gas from one chamber to the next above it, in such a manner as to obviate, to a great extent, the retardation of the rise of the gas produced by its frictional contact with the falling water; for when the plates A are covered with water, which rises to a level with the lower cut-away side of the tube, it passes down the tube upon that side only, while the gas, in ascending, passes upwardly upon the opposite or high side of the tube, and, instead of being subjected to the frictional contact and resistance of an annular stream of water, it impinges against the falling water only upon one side, and the permeation of the entire chamber by the heavy gas is thus facilitated.

In order to clean the plates A of the deposited impurities, which could not be effected through the apertures E, on account of the tubes F, each of the plates is centrally perforated, and a continuous vertical longitudinal pipe, C, arranged therethrough, of the same material as the plates. This tube may be provided with encompassing-washers, to hold the plates the proper distance apart, as shown, and is provided below with a communicating escape-pipe, C', passing at right angles through the side of the apparatus, and provided with a stop-cock, $b$. In the side of this pipe C, upon a level with the upper surface of each of the plates A, are arranged holes D, which holes must register with corresponding holes in the separating-washers $a$, when the latter are used. Now, whenever the plates A have become fouled by deposits of impurities from any source whatever, the water is admitted through the pipe J until the whole apparatus is filled, and the stop-cock $b$ being then opened, the impurities pass along with the water through holes D into the continuous pipe, and out through tube C'.

Upon the upper portion of the case B is arranged a dome, G, having an opening, H, in the apex. This dome forms a chamber above the truncated portion of the cone, in which is placed lime, soda, or potash, and which chamber communicates with the interior of the case B through a pipe, K. The object of this arrangement is to enable the operator to know when the chamber is properly filled with gases; for the gas, being heavier than the air, is less dense at the top, and its presence in the dome G indicates the condition of the apparatus, the soda, potash, and lime being employed to take up and utilize the escaped portions of the gas from the apparatus.

L is a subjacent gas-tight receiver for the chlorine water or hydrated gas. It is made of the same material as the other parts of the apparatus, and is provided with a straight pendent pipe, M, through which the water, with the absorbed gas, passes from the apparatus above, and is provided, also, with a stop-cock, O, for drawing off the same. Said pipe M reaches nearly to the bottom of the receiver, so that after a small quantity of the liquid has passed into the receiver it becomes sealed against the escape of any free chlorine contained within the receiver which may have been unabsorbed.

Having thus described the construction and arrangement of the apparatus, I will now proceed to show the advantages arising out of the same when used for hydrating chlorine.

In the first place, the use of the material—glass, earthenware, or analogous substances—combines the advantages of lightness, ease of manufacture, and the necessary quality of resisting the action of the chlorine.

The cone shape of the apparatus involves advantages, also, for the reason that chlorine gas, being heavier than air, accumulates in heavier volumes near the bottom, and, inasmuch as the base is so much larger than the top, a larger amount of gas can be absorbed there by reason of the more extended surface of water. This is particularly advantageous, by reason of the fact that the gas is first admitted at this point.

The alternate arrangement of the apertures in the plate A compel the passage of the gas along the surface of the water, and hold it in contact with the same for a greater length of time, while the construction of the tubes F permits the more thorough permeation of the chambers by the gas, and the construction and arrangement of the central tube permit the ready cleansing of the plates, without removal of the parts, from all impurities in the shape of deposits from the water and alkalies in the dome.

Having thus described my invention, what I claim as new is—

1. In an apparatus for hydrating gases, a case having an inlet for the water above, an inlet for the gas below, and provided with an intermediate water-percolating medium, combined with a reservoir located below the level of the water-percolating case, and having a water-sealed communication therewith, for the purpose described.

2. In an apparatus for hydrating gases of a greater specific gravity than the air, the combination of a conical circular case, B, a series of perforated plates, A, of constantly-diminishing diameters from bottom to the top, a water-pipe, J, arranged at the top, and an inlet, I, for the gas arranged at the bottom, substantially as and for the purpose described.

3. The combination, with the plates A, of a continuous pipe, having lateral openings upon a level with the upper surface of said plates, as and for the purpose described.

4. In a machine for hydrating gases, the combination, with the absorption-chamber and a subjacent air-tight receiver, L, of a straight pendent pipe, M, forming communication between the said absorption-chamber and the receiver, and opening near the bottom of the latter, so as to permit the down-flow of the chlorine water, but seal the said receiver against the escape of free chlorine gas.

5. The dome G, having opening H, in combination with the absorption-chamber and the pipe K, forming a communication between the said absorption-chamber and dome, substantially as and for the purpose described.

WILLIAM MAYNARD.

Witnesses:
T. B. MOSHER,
ALEX. F. ROBERTS.